No. 841,683. PATENTED JAN. 22, 1907.
J. J. GLEDHILL.
VEHICLE FOR CARRYING BRICK.
APPLICATION FILED SEPT. 9, 1905.
2 SHEETS—SHEET 2.
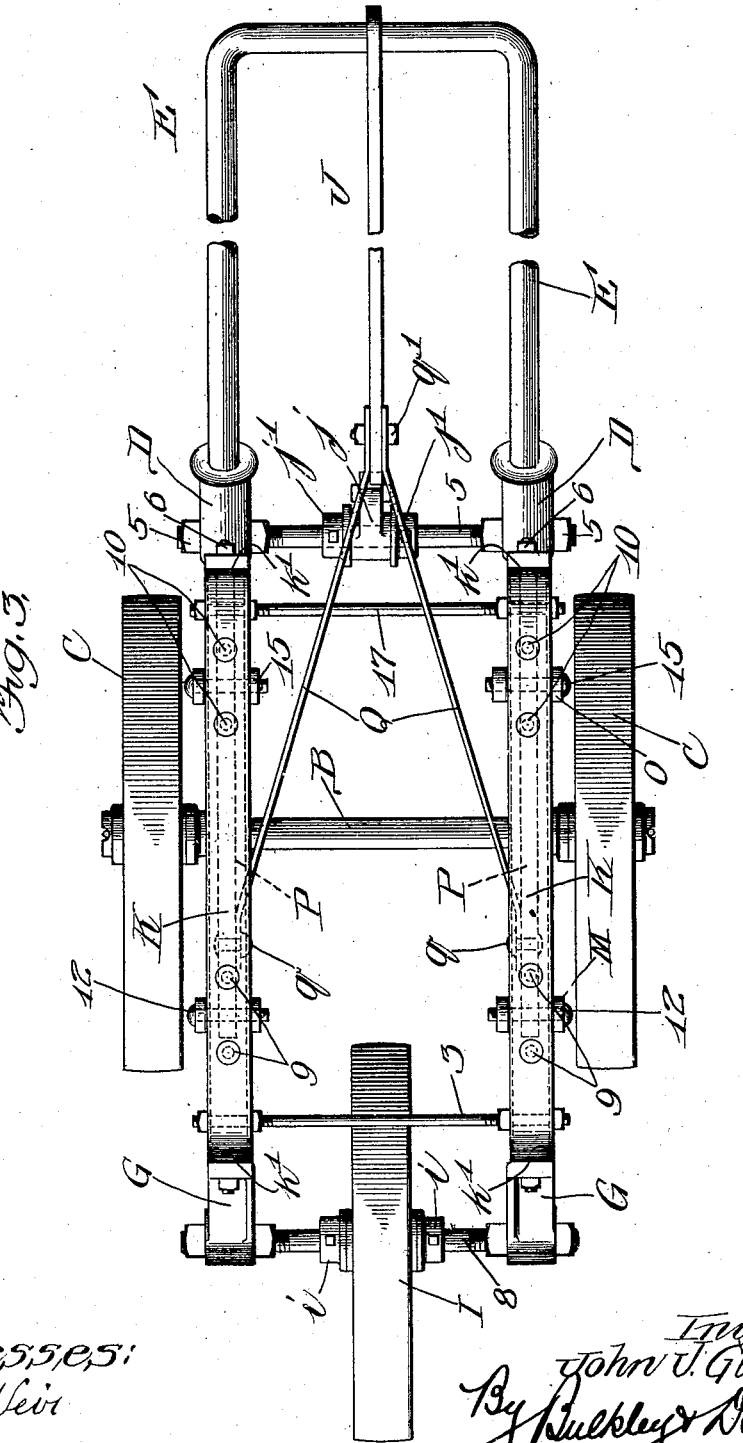

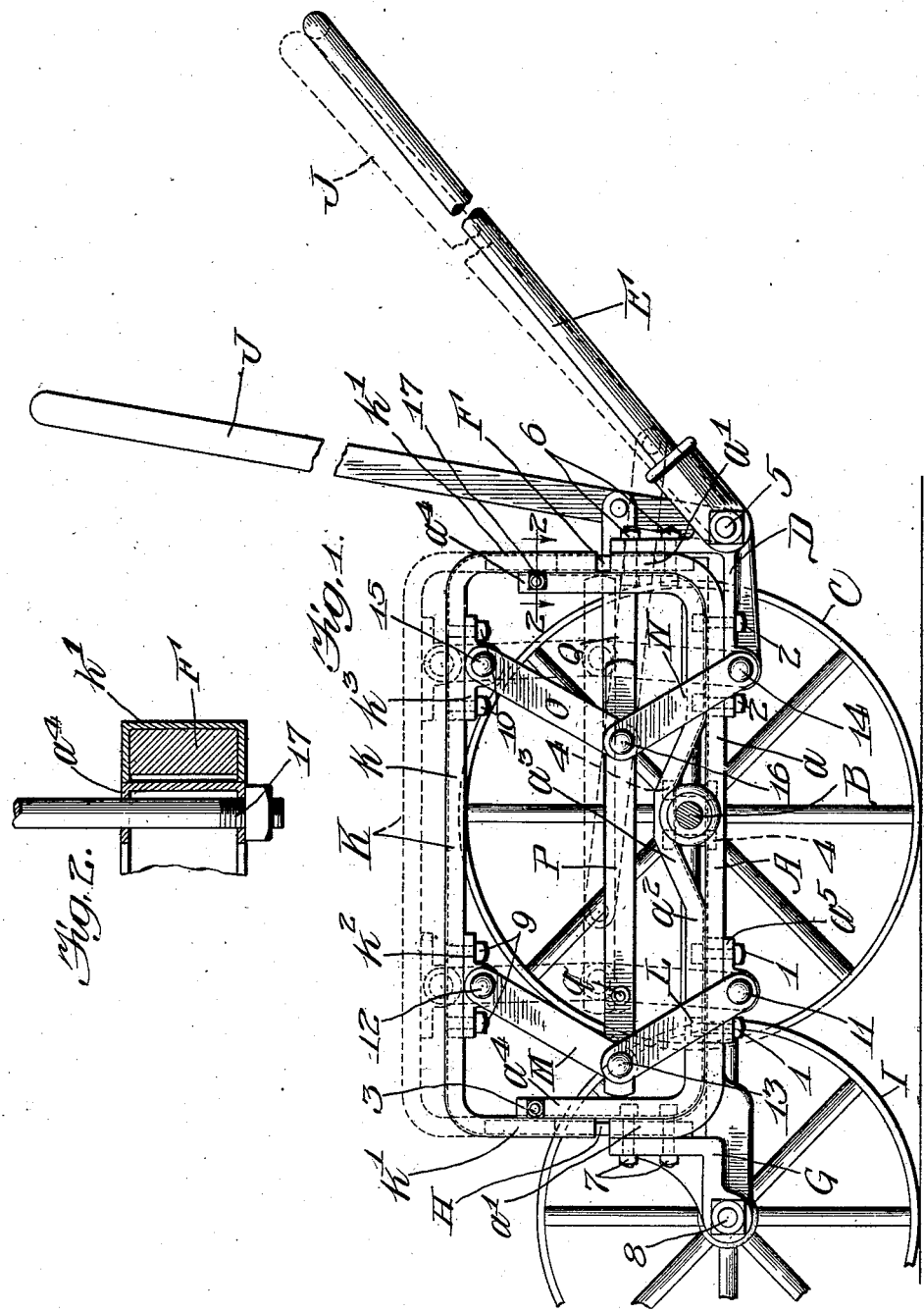

UNITED STATES PATENT OFFICE.

JOHN J. GLEDHILL, OF ST. LOUIS, MISSOURI.

VEHICLE FOR CARRYING BRICK.

No. 841,683.　　　　Specification of Letters Patent.　　　　Patented Jan. 22, 1907.

Application filed September 9, 1905. Serial No. 277,788.

*To all whom it may concern:*

Be it known that I, JOHN J. GLEDHILL, a citizen of the United States of America, and a resident of St. Louis, Missouri, have invented a certain new and useful Improvement in Vehicles for Carrying Brick, of which the following is a specification.

My invention relates to carts or wagons for carrying brick, and more especially to vehicles which are of a size and character to be pushed or moved around by hand, whereby a pallet of brick may be readily lifted from its support and carried to another place, the cart or wagon embodying in its construction suitable means for raising and lowering the part of its structure upon which the pallet of brick is supported, thus permitting the vehicle to be positioned below the pallet of brick to be moved to another place and making it possible to then raise the brick-support of the vehicle, so as to raise the pallet of brick from its temporary resting-place and to then transport and deliver the brick to a suitable supporting structure, after which the vehicle can be drawn out from under the brick thus transported and brought to a new resting-place.

Generally stated, the object of my invention is to provide an improved and highly-efficient vehicle of the foregoing general character.

Special objects of my invention are to simplify and strengthen the construction of the vehicle; to provide an improved construction and arrangement for raising and lowering the brick support or structure upon which the bricks rests while supported by the vehicle; to provide an improved construction and arrangement whereby the vehicle may involve a pair of main supporting vehicle-wheels and a third wheel which can rest upon the ground or floor while the vehicle is traveling in a straight line, but which can be tilted upward when it is desired to turn the vehicle around or change its course of travel, and to provide certain details of construction and features of improvement tending to increase the general efficiency and serviceability of a vehicle of this particular character.

To the foregoing and other useful ends my invention consists in matters hereinafter set forth and claimed.

In the accompanying drawings, Figure 1 is a side elevation of a vehicle embodying the principles of my invention, a portion of the third wheel being shown broken away for convenience in illustration. Fig. 2 is an enlarged detail section on line 2 2 in Fig. 1. Fig. 3 is a plan of the vehicle shown in Fig. 1.

As thus illustrated my invention comprises a body-frame A, composed of a couple of parallel channel-irons $a$, the same being arranged with their channeled sides facing downwardly and with upturned end portions $a'$. At each side of the vehicle another channel-iron $a^2$ is laid upon and secured to the top of the adjacent channel-iron $a$, these channel-irons $a^2$ having raised middle portions $a^3$ and upturned end portions $a^4$, it being observed that the channel-irons $a$ and $a^2$ are arranged back to back, so to speak, and secured together by bolts 1 and 2. The upper ends of the portion $a^4$ are connected by transverse or horizontally-extending tie-rods or bolt-like members 3. The axle B, upon the end portions of which are mounted the main vehicle-wheels C, extends transversely across the vehicle at a point between the channel-irons $a$ and $a^3$ and is secured in place by bolts 4. It will be seen that these wheels are arranged at each side of the body-frame and are of a size to support the same in a sufficiently-elevated position.

At its rear end, the vehicle being in the nature of a push-cart, the body-frame is provided at each side with castings D, to which is rigidly secured a bail-shaped handle E, the two castings being rigidly tied together by a long bolt or tie-rod 5. It will be seen that the bolts 2 extend through these castings D and also through the channel-irons $a$ and $a^3$, thus binding the whole firmly together. The vertically-extending portions of the said castings and of the channel-irons $a$ and $a^3$ are tied together by bolts 6, and at this juncture it will be seen that the solid and vertically-disposed guides F are disposed in the channels of the upturned end portions $a'$ and are secured therein by the bolts 6. These guides preferably extend upwardly a short distance above the upper ends of the portions $a^4$. At its forward end the body-frame is provided with a pair of castings G, one at each side, and these castings are secured to the upturned end portions $a'$ and $a^4$ of the channel-irons by means of bolts 7. At this end the body-frame is provided with vertically-disposed guides H, similar to the guides F and secured in place by the bolts 7. These guides, like the guides F, preferably extend upwardly a short distance above the upper ends of the vertical portions $a^4$. The two castings G are preferably tied together by a long bolt or tie-rod 8. It will now be seen that the third and relatively small vehicle-wheel I is mounted to rotate upon the bolt or tie-rod 8, while the operating-lever J is fulcrumed to turn upon the bolt or tie-rod 5. Preferably the wheel I and the hand-lever J are disposed in line with each other and at points substantially midway between the two sides of the vehicle.

The vertically-movable brick-support K comprises two parallel channel-irons $k$, one at each side of the vehicle, and arranged with their channels facing downward and with downwardly-bent end portions $k'$. These downwardly-bent end portions $k'$ are adapted to slide up and down on the guides F and H, as shown more clearly in Fig. 2. Each channel-iron $k$ is provided on its under side with front and rear castings $k^2$ and $k^3$, the same being secured in place by bolts 9 and 10, as shown in Fig. 1. At this juncture it will also be seen that the bolts 1 are employed for securing similar castings $a^5$ to the under sides of the channel-irons $a$ and that the bolts 2 assist in securing the castings D to the same channel-irons. The brick-support K is raised and lowered by four toggle connections, two at each side, the castings $a^5$ being connected with the casting $k^2$ by means of toggle-arms L and M, which are pivotally connected at their upper and lower ends with the said castings by means of bolts 11 and 12. It will also be seen that the meeting end portions of these toggle-arms are connected by means of bolts 13.

At the rear end of the framework of the vehicle the castings D and $k^3$ are connected by toggle-arms N and O, the castings being connected to the ends of the arms by pivot-bolts 14 and 15 and the lower arms at each side being connected to the upper arms by means of bolts 16. In this way there are, as stated, four toggle connections between the brick-support K and the body-frame A, it being understood that through the medium of these toggle connections the brick-support can be raised and lowered, as shown in dotted lines in Fig. 1. At each side the middle portions or knuckle-joints of the toggles are connected by horizontal and longitudinally-disposed connecting-bars P, whereby if one toggle breaks joint in a forward direction the others necessarily follow—that is, the toggles are so connected that they must move in unison. As an efficient arrangement for operating these toggles the side bars or connecting members P are connected with the hand-lever J by means of a pair of connecting rods or bars Q. It will be seen that these rods or bars Q have their forward or separated ends pivotally connected with the bars P by means of bolts or pivotal connections $q$, while at their rear or convergent ends the said bars or rods Q are pivotally connected to the lever by means of a bolt or pivotal connection $q'$. At this juncture it will be seen that the wheel I is prevented from shifting laterally by means of collars $i$, attached to the tie-bolt or long bolt 8, upon which the said wheel is mounted, the two collars being of course disposed at opposite sides of the wheel, and in a similar way the mounted or hub portion $j$ of the hand-lever J is prevented from shifting laterally upon the bolt or tie-rod 5 by means of collars $j'$, which are fixed to the said rod or bolt at each side of the lever.

The stationary side portions of the body-frame A are not only connected at the forward end of the vehicle by the rod or tie-bolt 3, but are also connected at the rear end of the vehicle by a similar rod or tie-bolt 17, the latter extending through the upper ends of the portions $a^4$. It will be readily understood that the rods or bolts 3, 5, 8, and 17 may all be provided at their end portions with suitable nuts adapted to clamp on both sides of the stationary or rigid side members of the frame or body A, as shown more clearly in Fig. 3.

With this construction the brick-support K can be lowered by throwing the handle upward and into the approximately vertical position shown in Fig. 1. In such condition the vehicle can be positioned beneath a pallet of brick, and such pallet of brick can then be lifted from its stationary supporting structure by swinging the handle positioned as shown in dotted lines in Fig. 1. When the handle is raised for the purpose of lowering the brick-support, all of the toggle connections are compelled to break joint in a forward direction—that is, in a direction toward the forward or front wheel I; but when the handle J is pulled down into the position indicated the said toggles are then all straightened out, and the movement is preferably just sufficient to cause said toggles to break joint slightly in a rearward direction, as shown in dotted lines in Fig. 1, as by so doing the knuckle-joints of the toggles are moved slightly past the center, thus retaining the brick-support in its raised position. Raising the brick-support raises the pallet of brick from its supporting structure, as stated, and in such condition the vehicle can then be pushed forward or drawn in the opposite direction, according to the convenience of the operator. When the desired position for the pallet of brick is reached—as, for example, by wheeling the vehicle between a couple of supporting members—the handle J can then be thrown into its raised position, thus lowering the brick-support K and allowing the pallet of brick to go down and rest upon said supports arranged at each side of the vehicle.

During the movements or use of the vehicle the front wheel I, which has its axis rigidly connected with the body-frame A, can be tilted off from the ground, so as to make it easy to turn the vehicle around or to alter its course of travel. In this connection it will be observed that the axle B is preferably somewhat nearer the rear or handle end of the body-frame, thus throwing considerable weight upon the wheel I when the latter is upon the ground—that is to say, the position of the axle is such that the weight of the brick upon the vehicle has no tendency to tilt the wheel I upward and away from the ground, although of course the vehicle is preferably so nearly balanced upon its axle that it is very easy for the operator to tilt the said wheel I off the ground by simply bearing down upon the handle E.

When the brick-support K is held in its raised position, it is prevented from falling—that is, the toggles are prevented from breaking joint in a forward and rearward direction by the engagement of the end of the handle J with the cross-piece of the bail-shaped pushing-handle E. In other words, this handle J can swing downward as far as the position indicated in dotted lines in Fig. 1, and when it reaches such position the centers of the toggles are just past the center in a rearward direction and can move no farther in such direction. In this way the brick-support K is very easily raised and lowered, the portions $k'$ sliding freely and accurately upon the solid guide-posts or guides H and F, which guides constitute upright portions of the rigid body-frame A, inasmuch as they are arranged at the four corners of the vehicle-frame and rigidly connected with the parallel and horizontal and longitudinally-disposed channel-irons which constitute the stationary or rigid body portion of the vehicle.

What I claim as my invention is—

1. A vehicle for carrying brick, comprising a rigid body-frame mounted on wheels, a bail-shaped handle rigidly secured to one end of said body-frame, a brick-support mounted to slide up and down on said body-frame, a plurality of toggle connections connecting the brick-support to the body-frame, said toggle connections being adapted to break joint away from the handle in order to lower the brick-support, and adapted to break joint in a direction toward the handle for the purpose of retaining the brick-support in a raised position, and a hand-lever associated with said pushing-handle and connected for operating said toggles.

2. A vehicle for carrying brick, comprising a body-frame mounted on wheels, a brick-support mounted to slide up and down on said body-frame, a plurality of toggles arranged at one side of the vehicle and adapted for connecting the body-frame to the brick-support, a plurality of similar toggles arranged at the other side of the vehicle and also adapted for connecting the brick-support with the body-frame, a bar at one side of the vehicle for connecting the toggles at that side, a bar for connecting the toggles at the other side of the vehicle, a handle rigidly connected with the body-frame, and a pivoted hand-lever associated with said handle and connected with said bars, whereby the brick-support can be raised and lowered by operating said hand-lever, said toggles being adapted to break joint in a direction away from the handle and hand-lever when the brick-support is lowered.

3. A vehicle for carrying brick, comprising a body-frame composed of parallel and longitudinally-arranged channel-irons, one channel-iron being arranged on top of the other at each side of the vehicle, an axle extending across and secured between the said upper and lower channel-irons, said channel-irons having their front and rear ends upturned and provided with vertical guides, wheels mounted on said axle, a brick-support composed of parallel and longitudinally-disposed channel-irons having their end portions bent down and adapted to slide up and down on said guides, toggles connecting the brick-support with the body-frame, a handle rigid with the body-frame, and a swinging hand-lever connected for operating said toggles, whereby the brick-support can be raised and lowered by operating the hand-lever.

4. A vehicle for carrying brick, comprising a body-frame, an axle extending transveresly of the body-frame, vehicle-wheels mounted on the ends of the axle, a pair of castings secured to the forward end of said body-frame, a bolt or tie-rod connecting said castings, a third wheel mounted upon said bolt or tie-rod, castings secured to the other end of the body-frame, another bolt or tie-rod connecting said last-mentioned castings, a bail-shaped handle rigidly secured to said last-mentioned castings, a hand-lever fulcrumed on said last-mentioned bolt or tie-rod, and a brick-support mounted to slide up and down upon the body-frame and suitably connected to be operated by said hand-lever.

Signed by me at St. Louis, Missouri, this 5th day of September, 1905.

JOHN J. GLEDHILL.

Witnesses:
E. L. HESS,
HERMAN D. LEMPHE.